United States Patent Office 3,838,007
Patented Sept. 24, 1974

3,838,007
WATER-INSOLUBLE ENZYME COMPOSITION
Antoon Gerardus van Velzen, The Hague, Netherlands, assignor to Gist-Brocades N.V., Delft, Netherlands
No Drawing. Filed Sept. 20, 1972, Ser. No. 290,493
Claims priority, application Great Britain, Sept. 24, 1971, 44,730/71
Int. Cl. C07g 7/02; C12b 1/00; C12d 13/02
U.S. Cl. 195—31 R
30 Claims

ABSTRACT OF THE DISCLOSURE

A water insoluble enzyme preparation is prepared by a process involving the steps of suspending a non-proteolytic enzyme in an aqueous solution of gelling protein, combining the mixture obtained with an organic liquid poorly miscible or immiscible in water to produce a suspension having the protein in particulate form, treating the resulting suspension to effect gelation of the gelling protein and contacting the resultant gelled protein particles with a bi- or polyfunctional protein reagent to cross-link the molecules of the proteins present in the particles. The insoluble enzyme preparation can be used in column and bed reactors for enzymatic reactions such as for inversion of saccharose or hydrolysis of starch.

STATE OF THE ART

Water-soluble enzymes cross-linked with proteins or hydrolysed proteins with a bifunctional protein reagent are known per se. For example, enzymes cross-linked with a protein hydrolysate by a bifunctional protein reagent such as glutaric dialdehyde are known which can be used for various purposes such as additives for washing compositions when the enzyme is proteolytic.

Insoluble enzyme preparations prepared by cross-linking enzymes with a bifunctional protein reagent are also known. All these preparations are obtained in powder form and have the disadvantage that, generally, the powder cannot be separated from the reaction mixture without difficulty, and when used in column reactors and packed bed reactors, very low flow rates are generally the result. In stirred enzyme reactors, the enzyme powder is easily damaged by attrition. Fluidized bed reactors can only be used at very low flow rates.

OBJECTS OF THE INVENTION

It is an object of the invention to provide water-insoluble enzyme compositions in particulate form of desired sizes, which can be used in column fillings, bed reactors, stirred reactors, etc., without the above-mentioned disadvantages.

It is another object of the invention to provide a novel process for the preparation of the said water-insoluble enzyme compositions.

These and other objects and advantages of the invention will become obvious from the following detailed description.

THE INVENTION

The novel water-insoluble enzyme compositions of the invention in solid or semi-solid particulate form of desired sizes are prepared by bringing a non-proteolytic enzyme and a gelling protein, e.g. gelatin, into a particulate form, and reacting the mixture, obtained in particulate form with a bi- or polyfunctional protein reagent. The term "non-proteolytic enzyme" as used in this specification means an enzyme which does not cause hydrolysis of the gelling protein. The term "bi- or polyfunctional protein reagent" means a compound capable of cross-linking molecules of proteins such as the above-mentioned enzymes and gelling proteins. The term "gelling protein" used herein means a protein of which an aqueous solution may be transformed into a solid or semi-solid state by special treatment, e.g. by cooling when gelatin is used, or heating when fresh egg white is used.

The process provides for the preparation of a water-insoluble enzyme preparation in semi-solid, or preferably solid particulate form comprising the steps of bringing a mixture of a non-proteolytic enzyme and a gelling protein solution into a particule form and treating the said mixture in particulate form with a bi- or polyfunctional protein reagent to cross-link molecules of the enzyme or the gelling protein, and/or molecules of the enzymes and the gelling protein in the particulate form. The enzymes in particulate form of desired sizes are advantageous in that they are better suited for column fillings where spherical particles permit higher flow rates than insoluble enzymes in powder form.

The term "particulate form" used in this specification should be interpreted in a broad sense. The particulate form may be a form of spherical or almost spherical particles, but, although the specification generally refers to those spherical or almost spherical particles, the particulate form may also be the form of, for example, fibers, e.g. extruded fibers, a cast film, a coating of vessels and impregnated tissue or paper. In general, "particulate form" means a form of the enzyme preparation of defined desired sizes.

The gelling protein which is preferably gelatin is essential to bring the enzymes into a water-insoluble particulate form of desired sizes and also stabilizes the enzyme. Although the cross-linking of enzymes with bi- or polyfunctional protein reagents is known and entrapment of enzymes in an insoluble gel of, e.g. polyacrylamide is known, it is novel to bring the enzyme together with a gelling protein into a particulate form and to cross-link the mixture in particulate form with a bi- or polyfunctional protein reagent.

The enzyme preparation in particulate form obtained by the process is extremely useful for column fillings and reactors such as bed reactors for enzymatic reactions, especially those reactions in which the final product is not allowed to contain the enzyme employed, for example, conversion of carbohydrates such as sugars into different products.

Although the mixture of non-proteolytic enzyme and gelling protein in particulate form can be obtained by spraydrying or prilling processes, it is preferably formed by dissolving or suspending a non-proteolytic enzyme in an aqueous solution of the gelling protein and combining this mixture with a poorly water miscible or water immiscible organic liquid so that the particulate form is obtained, and treating the resulting suspension in particulate form in such a way that gelation of the gelling protein is achieved such as by cooling when gelatin is the gelling protein. Combining of the mixture containing the enzyme and the gelling protein with the organic liquid may be carried out by mixing under controlled agitation, or by submerged spraying of the mixture of the enzyme and the gelling protein into the organic liquid. The latter procedure may be performed in a vertical column in which the particles formed are moving downward in the organic liquid which may contain the cross-linking agent.

The cross-linking of the enzyme-gelling protein mixture may be carried out by separating the mixture in particulate form from the organic liquid and treating it with the cross-linking bi- or polyfunctional reagent, or alternatively the mixture in particulate form suspended in the organic liquid may be treated with the said reagent.

Enzymes which are employed in the process are those having no proteolytic activity because proteolytically active enzymes would decompose the gelling protein even after the cross-linking step and give physically very unstable products. Examples of suitable non-proteolytic enzymes which may be used are invertases, amyloglucosidases, lactases, maltases, amylases, ureases, lipases, esterases, glucose isomerases, glucose oxidases, dehydrogenases and penicillinases. Mixtures of enzymes may also be employed in the process so that the resulting enzyme-gelling protein particles can be utilised for carrying out two or more enzymatic reactions. Also, insoluble enzymes may be employed such as when they are in an unfavorable form, e.g. a powder and even microorganisms and spores containing enzymes may be employed in the process. Complexes of enzymes and hydrated oxides such as hydrated aluminum oxide may be employed, too.

The enzyme-gelling protein mixture which is used in the process as a starting material may be prepared by dissolving or suspending the enzyme in an aqueous gelling protein solution. The temperature of the aqueous gelling protein solution should be such that an active mixture is obtained in a liquid form. Therefore, a temperature of about 20° C. to 35° C. is preferred with the maximum temperature depending on the enzyme being generally about 60° C. to 65° C., but higher temperatures may be employed in exceptional cases.

Using gelatin, the concentration in the solution is dependent on the specific gelatin used and may vary within limits of about 0.1 to about 25% by weight based on the water used, preferably within limits of about 5 to 10% by weight. The enzyme concentration depends on the purpose for which the insolubilised enzyme is to be used as well as on the activity thereof. The pH of the solution is preferably that at which the enzyme possesses its greatest stability under the circumstances involved, but, as gelatin is also present, the pH should be within limits of about 2 and 12, preferably within 3 to 10 in order to allow the gelatin to gell. For other gelling proteins, the pH range may differ.

During the preparation of the enzyme-gelling protein mixture, stabilisers may be added which in addition to the gelling protein stabilise the enzyme. Examples of stabilisers useful in the process are sorbitol, glycerol, substrates for the enzymes in question such as lactose for lactase, etc.

The organic liquid used to bring about the particulate form of the aqueous enzyme-gelling protein solution is an organic liquid poorly miscible or immiscible in water and compatible with the non-proteolytic enzyme and gelling protein. It must be at a temperature below its boiling point or range at the pressure employed, and generally at a temperature below about 65° C. Examples of suitable organic liquids are aliphatic alcohols with four or more carbon atoms such as butanol, esters of alcohols and lower fatty acids such as ethyl acetate, butyl acetate and ethyl propionate, branched or straight chain aliphatic hydrocarbons such as paraffin oil and petroleum ether, aromatic hydrocarbons such as benzene and its homologs, chlorinated hydrocarbons such as methylene chloride and trichloroethylene, and mixtures of two or more of the above-mentioned liquids.

One or more surface-active agents may optionally be added to the organic liquid as they generally enable a better control of the dispersion state of the enzyme-gelling protein suspension to be obtained in the organic liquid. Suitable surface-active agents are those commonly used for similar purposes and may be selected from anionic, non-ionic, cationic or zwitterionic surface-active agents.

Types of agitation used during the combining of the aqueous enzymes-gelling protein mixture and the organic liquid and the cooling operation (when gelatin is used) of the resulting suspension may be any one resulting in a division of the aqueous enzyme-gelling protein mixture into particles of the desired sizes. The sizes obtained depend on the intensity of agitation, the difference in specific gravities of the liquids, the surface tensions and viscosities of the liquids, and in some cases the rate of cooling, the temperature and the concentration of the initial aqueous enzyme-gelling protein solution or suspension. Generally, stirring is sufficient but other methods such as spraying the enzyme-gelling protein mixture into the organic liquid to form the suspension may be used. Cooling of the enzyme-gelatin mixture in the organic liquid, e.g. down to about 10° C. or lower and even below the freezing point of the said mixture, may be applied simultaneously with or after the formation of the suspension of the mixture in the organic liquid, and cooling may be carried out quickly or slowly.

The cross-linking step is carried out with a bi- or polyfunctional protein reagent forming covalent bonds with the enzyme and/or the gelling protein. Examples of suitable bifunctional protein reagents are aldehydes such as glutaric dialdehyde, acrolein or crotonaldehyde, esters such as chloroformic acid esters, acid halides such as acid chlorides, epoxides such as epichlorohydrin, derivatives of dimethyladipic acid, carbodiimides, phenol-2,4-disulphonyl chloride, bromocyanide, activated agents such as bromocyanide-activated compounds of acid halides, or mixtures of two or more of those compounds. Preferably, an aqueous solution of glutaric dialdehyde is employed.

An embodiment of the invention is formed by a step involving dehydration of the enzyme-gelling protein particles. Suitable dehydration agents are liquids having a high solubility in water or are miscible with water and they must be compatible with the enzyme. Examples of suitable dehydration agents are alcohols with up to three carbon atoms such as methanol, ethanol or isopropanol, acetone, or a mixture of two or more of those compounds. The cross-linking bi- or polyfunctional protein reagent may be added to this liquid or applied to the particles after the dehydration step. The dehydration step may be applied prior to or after separation of the particles from the organic liquid used for the suspension step. The dehydration step reduces the sizes of the enzyme-gelling protein particles, and an improvement of the cross-linking reaction is obtained when these shrunken particles are brought into an aqueous solution of the bi- or polyfunctional protein reagent because of the swelling properties of the dehydrated particles.

Insoluble fillers may be added to the enzyme-gelling protein mixture employed in the process as they improve the physical properties of the final particulate form. Examples of suitable insoluble fillers are finely divided silicates or silicon oxides such as "Ketjensil" (a synthetic silicon oxide), Hy-flo, Dicalite, diatomerous earth, etc.

Finally, the enzyme-gelling protein preparations obtained in particulate form by the process are preferably washed. Examples of suitable washing liquids are water or buffered solutions having a pH depending on the enzyme. Generally, drying of the preparation in particulate form is not necessary, but in special cases a drying step may be included. For special applications, the cross-linking step may be repeated for optimal physical properties.

The gelling protein used in the invention such as gelatin is a polyelectrolyte which possibly influences the apparent pH optimum of the enzyme, i.e. the pH where the enzyme unfolds its highest activity. In addition, other compounds influencing the apparent pH optimum of the enzyme may be included in the particles such as other polyelectrolytes examples of which are protamine sulfate and polyacrylic acid, thus adapting the apparent pH optimum of the enzyme-gelling protein particles to their future purpose for instance.

The water-insoluble enzyme-gelling protein preparations in particulate form obtained by the process which are also an aspect of the invention may be used for enzyme reaction purposes, and may be used in columns or reactors for example. The enzyme-gelling protein particles can be separated easily from the reaction mixture and may be repeatedly used.

The water-insoluble, enzyme-gelling protein preparations in particulate form, may in general be used in all processes where the soluble enzyme is used. For example, invertase-gelling protein particles may be used for the inversion of saccharose, amyloglucosidase for the hydrolysis of starch and dextrines, as in beer manufacturing. Further the water-insoluble enzyme-gelling protein preparations in particulate form may be used in cases where soluble enzymes cannot be used.

The enzyme-gelling protein particles may become contaminated by microorganisms during use and sterility can be restored by re-treating the particles with the aforementioned bi- or polyfunctional protein reagents.

In the following examples there are described several preferred embodiments to illustrate the invention. However, it should be understood that the invention is not intended to be limited to the specific embodiments.

EXAMPLE 1

2 grams of invertase were suspended in 100 ml. of an aqueous solution containing 7.5 grams of gelatin at a temperature of about 45° C. and the pH was adjusted to 7. This aqueous enzyme-gelatin suspension was added with stirring to 400 ml. of n-butanol whose temperature was 50° C. and then the suspension obtained was rapidly cooled to 10° C. whereby enzyme-gelatin-containing particles were formed. The butanol was decanted off, and after the enzyme-gelatin-containing particles were dehydrated by the addition of 400 ml. of a 96% (v./v.) aqueous ethanol solution, the liquid was subsequently removed. The particles obtained were cross-linked by reaction with a solution of 3.75 g. of glutaric dialdehyde in 200 ml. of water and after removal of the liquid, the particles were washed with water until the odor of butanol could no longer be detected. The particles obtained had good physical stability and were insoluble in water.

The utility of the enzyme-gelatin-containing particles thus obtained was demostrated by filling a plug flow column reactor (height 22 cm.; diameter 4 cm.) with the enzyme-gelatin-containing particles and passing a 10% (w./v.) aqueous solution of saccharose at pH 4.5 through the reactor at varying flow rates. The amount of invert sugar formed was calculated from the glucose content of the effluent, and was expressed as the percentage of saccharose converted. The percentage conversion decreased with increasing flow rate. The reactor was kept in operation continuously for 12 weeks at room temperature. During the 9th week of operation, however, the conversion rate of the column reactor dropped which was caused by microorganisms growing on the enzyme particles. No precautions were taken to maintain the sterility until this 9th week. However, the original conversion rate was restored by thoroughly washing and sterilizing the enzyme-gelatin-containing particles in the column by precolating a 2% (w./v.) solution of glutaric dialdehyde in water through the column. The following results are reported in Table I and show the high stability of the insolubilized invertase used.

TABLE I

| Flow rate (ml./hr.) | Percent conversion of saccharose | |
| --- | --- | --- |
| | Initially | After 12 weeks |
| 200 | 100 | 100 |
| 300 | | 80 |
| 400 | 80 | |
| 500 | 70 | 68 |
| 700 | | 50 |
| 800 | 50 | |
| 1,500 | 30 | 30 |

EXAMPLE 2

A fluid bed column reactor (height 75 cm., diameter 2.5 cm.) was fiilled with 150 ml. of the invertase-containing particles and an aqueous solution of 80% (w./v.) of saccharose having a pH of 4.5 was passed through the reactor at a flow rate of 10 ml./hr. At this flow rate, the conversion of the saccharose was 100% and the reactor was kept in operation continuously for 7.5 months at room temperature. After this period, the reactor was kept in operation for another two months under identical conditions with the exception of the pH of the substrate solution which was left at a neutral pH instead of being adjusted to 4.5. The same conversion was observed. Thus, the reactor was in operation for a total of 9.5 months without loss of enzymatic activity.

EXAMPLE 3

160 g. of invertase were dissolved in 16 liters of an aqueous solution containing 1280 g. of gelatin which was brought to a temperature of 40° C. and the pH was 5.6. To this mixture, 400 g. of Ketjensil 125 (synthetic silicon oxide) were added and after homogenization, the complete mixture was slowly poured into 35 liters of butyl acetate at a temperature of 45° C. containing 350 g. of Span-80 under controlled agitation. The suspension obtained was cooled to 12° C. and the cross-linking reaction was carried out by adding 1350 ml. of a 25% aqueous solution of glutaric dialdehyde and then stirring for 20 minutes. Then, 40 l. of ethanol were added thereto and the particles were separated from the butyl acetate-ethanol mixture, and washed twice with 40 l. of ethanol and 4 times with 40 l. of water to obtain approximately 17 l. of enzyme-containing particles corresponding to about 3.5 kg. based on dry weight.

EXAMPLE 4

For the continuous production of the insolubilized enzymes, the process was modified in the following way. The enzyme-containing gelatin solution was pumped through a number of narrow tubes into a column containing butyl acetate. The tubes, which were placed with their lower ends below the level of the butyl acetate, delivered a constant stream of the enzyme-gelatin solution which stream broke up into small droplets upon reaching the butyl acetate. The size of the droplets was dependent on the speed of the pump. The butyl acetate contained glutaric dialdehyde and the length of the column was 5 meters so that the droplets traveling down in the column by the influence of gravity had ample time to gell and to react with the glutaric dialdehyde. The lower part of the column was cooled to 5° C. for this purpose and the particles obtained were continuously collected from the bottom of the column, separated from the butyl acetate and washed with water. The butyl acetate was recycled to the column after replenishment of the consumed glutaric dialdehyde. A column having an internal diameter of about 4 cm. produced 3 l. of the insolubilized enzyme particles per hour.

EXAMPLE 5

In a series of experiments, invertase-gelatin particles were prepared as described in Example 1 with the difference that the following organic liquids were used instead of n-butanol:

cyclohexane
petroleum ether (high-boiling fraction)
chloroform
benzene
toluene
methylene chloride
mixtures of chloroform and toluene.

In all experiments, physically stable and enzymatically active particles were obtained and the size of the particles was dependent on the solvent used. For instance, fine particles were obtained using chloroform, whereas the particles obtained using toluene were much coarser. In the experiment with the mixtures of chloroform and toluene, the particle size appeared to be dependent on the ratio of the amounts of chloroform and toluene. In the experiment with methylene chloride, the maximum temperature was 35° C., instead of 50° C.

EXAMPLE 6

Invertase-gelatin particles were prepared by the method as described in Example 1 with the difference that acrolein was used as the cross-linking agent instead of glutaric dialdehyde. The particles obtained were water insoluble and enzymatically active.

EXAMPLE 7

200 mg. of invertase were mixed with a solution of 7 ml. of fresh egg white in 14 ml. of water and the mixture was added to 80 ml. of stirred butyl acetate. The resulting suspension was heated to 65° C. and the particles solidified in 15 minutes. After cross-linking with glutaric dialdehyde, enzymatically active, water-insoluble particles were obtained.

EXAMPLE 8

6 g. of invertase were mixed with 400 ml. of an aqueous solution of 32 g. of gelatin at a temperature of 40° C., and a pH of 7. A piece of cotton filter cloth was immersed in this mixture and subsequently cooled in cold butyl acetate. After cross-linking with glutaric dialdehyde, the filter cloth was washed thoroughly with water and placed on a Buchner funnel. Filtration of an aqueous solution of 10% of saccharose through the piece of filter cloth resulted in conversion of the saccharose.

EXAMPLE 9

Water insoluble, active invertase-gelatin particles were prepared as described in Example 1 with the difference that dried cells of an invertase-producing yeast strain were used instead of a purified invertase preparation.

EXAMPLE 10

4 grams of amyloglucosidase were suspended in 400 ml. of a solution containing 8 g. of gelatin per 100 ml. of water, and 10 g. of Ketjensil 125 (a synthetic silicon oxide) were added thereto. The temperature was about 45° C. and the pH was adjusted to 7. The suspension thus obtained was added with stirring to 850 ml. of butyl acetate at 50° C., and the resulting mixture was cooled to 10° C. The resulting particles were then cross-linked by addition of 25 ml. of a 25% (w./v.) aqueous solution of glutaric dialdehyde and after stirring for 20 minutes, the cross-linked particles were then dehydrated using 1.6 liters of ethanol. After removal of the liquid by decantation, the particles were allowed to swell in 1.5 liters of water containing a further 10 ml. of the 25% (w./v.) aqueous glutaric dialdehyde solution. The enzyme-containing particles after separation were then washed with water until the odor of butyl acetate could no longer be detected.

The particles thus obtained were used to fill a plug flow reactor in the form of a packed bed and a 40% (w./v.) aqueous solution of starch hydrolysate of 19 dextrose equivalents (abbreviated to D.E.) was used as substrate and the reaction temperature was 55° C. During continuous operation of the reactor for three and a half weeks, no decrease in enzymatic activity of the particles was observed and the conversion factor was 97 D.C. at a flow rate of 25 ml./hr.

EXAMPLE 11

Insoluble amyloglucosidase-gelatin particles were prepared as described in Example 10 except that the pH was adjusted to 9 and equally good results were obtained.

EXAMPLE 12

Saccharification of starch (A) Continuous feed stirred tank reactor. The continuous conversion of starch to dextrose by insolubilized amyloglucosidase was carried out in a simple reactor. The substrate was made soluble by pretreating the starch with α-amylase and the conversion was measured by comparing the ratio of dextrose (determined as such with glucose oxidase) and the amount of reducing sugars, expressed in. g. of dextrose, determined according to the method of Hoffmann after hydrolyzing the residual polysaccharides by boiling with concentrated hydrochloric acid. The reactor was charged with substrate and insolubilized amyloglucosidase, and this mixture was incubated for 20 hours at 55° C. At this moment, the ratio had reached a value of 92% (initial value 6.5%), and the feed was started at a rate of 50 ml. per hour. The reactor effluent was analyzed two times a day to determine the abovementioned ratio. This ratio proved to be constant (92%) for 10 successive days (12 l. of substrate) and the insoluble enzyme had retained all its activity.

(B) Batch-wise conversion. Pretreated starch (as indicated under (A) of this Example) was converted to dextrose by insolubilized amyloglucosidase in a batch reactor at a temperature of 55° C. Every day, the insolubilized enzyme was separated from the reaction mixture after the conversion was complete, and was added to a fresh portion of substrate. Over a period of 60 days, a daily portion of substrate was converted to a D.E.-value of 94 (initial D.E.-value 20). This illustrates the high chemical and physical stability of the insolubilized enzyme during use.

EXAMPLE 13

Insolubilized alcohol dehydrogenase particles were prepared as described in Example 1 except for replacing the invertase by alcohol dehydrogenase from yeast. When added to a solution of 1% of NAD in a phosphate buffer having a pH of 9 containing 20% of ethanol, the particles catalyzed the reduction of NAD to NADH.

EXAMPLE 14

Insolubilized lipase particles were prepared as described in Example 1 except for replacing the invertase by a lipase (lipase "My"). The particles were enzymatically active as shown by potentiometric titration using an aqueous solution of triacetine as a substrate.

EXAMPLE 15

Insolubilized urease particles were prepared as described in Example 1 except for replacing the invertase by urease (B.D.H.). The particles were active against urea determined according to a method described in J. Clin. Path., Vol. 13 (1960), p. 156.

EXAMPLE 16

Insolubilized lactase particles were prepared as described in Example 1 except for replacing the invertase by the lactase β-galactosidase. MnSO₄ and lactose were added to the lactase-gelatin mixture to stabilize the enzyme and the particles obtained were active against o-nitrophenyl galactoside, a synthetic substrate used for the detection of lactase activity. After a storage period of 6 months in a refrigerator, the particles had retained their activity.

EXAMPLE 17

A mixture of invertase and glucose oxidase was insolubilized as described in Example 1 except for replacing the invertase by the above-mentioned enzyme mixture. The particles obtained were tested with saccharose as the substrate. The saccharose was inverted to fructose and glucose by the invertase, and the glucose in turn was converted to gluconic acid by the glucose oxidase, the latter reaction being observed by liberation of peroxide in the reaction mixture. The presence of this latter compound, which is a by-product of the glucose oxidase-catalyzed conversion of glucose to gluconic acid was established by its reaction with colorless chromogen. The experiment shows that particles containing two enzymes capable of effecting two enzymatic reactions can be prepared.

Various modifications of the products and process of the invention may be made without departing from the spirit or scope thereof and it is to be understood that the

I claim:

1. A process for the preparation of a water-insoluble enzyme preparation in semi-solid or solid particulate form with the enzymes dispersed in the particles, comprising bringing a mixture of a non-proteolytic enzyme selected from the group consisting of invertases, amyloglucosidases, lactases, maltases, amylases, ureases, lipases, esterases, glucose isomerases, dehydrogenases and penicillinases and mixtures of two or more of the said enzymes and a gelling protein selected from the group consisting of gelatin and fresh egg white in solution into a particulate form by dissolving or suspending the enzyme in an aqueous solution of the gelling protein, combining the mixture obtained with an organic liquid poorly miscible or immiscible in water so that the particulate form is obtained, treating the resulting suspension in particulate form to effect gelation of the gelling protein and treating the gelled protein in particulate form having said enzyme dispersed therein with a bi-or polyfunctional protein reagent selected from the group consisting of glutaric dialdehyde, acrolein, crotonaldehyde, chloroformic acid esters, acid halides, epoxides, derivatives of dimethyladipic acid, carbodiimides, phenol-2,4-disulfonyl chloride, bromocyanide-activated compounds of acid halides and mixtures of two or more of said compounds to cross-link the molecules of the proteins present in the particles to produce said particles having enzymes dispersed therein.

2. The process of claim 1 wherein the combining of the enzyme-gelling protein mixture with the organic liquid is carried out by mixing under controlled agitation.

3. The process of claim 1 wherein the combining of the enzyme-gelling protein mixture with the organic liquid is carried out by submerged spraying of the mixture of the enzyme and the gelling protein into the organic liquid.

4. The process of claim 1 wherein the enzyme used is selected from the group consisting of a water insoluble enzyme, a complex of the enzyme with a hydrated oxide and complete cells or spores of microorganisms.

5. The process of claim 1 wherein the temperature of the aqueous gelling protein solution is below about 65° C.

6. The process of claim 5 wherein the temperature is between 20 and 35° C.

7. The process of claim 1 wherein the concentration of the gelatin is between about 0.1 and 25% by weight based on the water used.

8. The process of claim 7 wherein the concentration is 5 to 10% by weight.

9. The process of claim 1 wherein the pH of the aqueous gelatin solution is between about 2 and 12.

10. The process of claim 1 wherein a polyelectrolyte selected from the group consisting of protamine sulfate and polyacrylic acid is added.

11. The process of claim 1 wherein the temperature of the organic liquid is below its boiling point at the pressure employed.

12. The process of claim 1 wherein a surface-active agent is added to the organic liquid.

13. The process of claim 1 wherein gelation of the gelling protein is obtained by cooling or heating applied simultaneously with or after the formation of the suspension of the enzyme-gelling protein mixture in the organic liquid.

14. The process of claim 1 wherein cooling is effected down to at least 10° C. to below the freezing point of the enzyme-gelling protein mixture.

15. The process of claim 1 wherein the bi- or polyfunctional protein reagent is glutaric dialdehyde.

16. The process of claim 1 wherein the enzyme-gelling protein particles formed are dehydrated with an agent miscible with water and compatible with the enzyme.

17. The process of claim 16 wherein the dehydrating agent is selected from the group consisting of alcohols with up to three carbon atoms, acetone and mixture of at least two of said compounds.

18. The process of claim 1 wherein an insoluble filler is added to the enzyme-gelling protein mixture.

19. The process of claim 18 wherein the insoluble filler is selected from the group consisting of finely divided silicates, silicon oxides, Dicalite and diatomaceous earth.

20. The process of claim 1 wherein the enzyme-gelling protein preparation in particulate form is washed with a liquid.

21. The process of claim 20 wherein the wash liquid is selected from the group consisting of water and buffered solutions having a pH depending on the enzyme.

22. A water-insoluble enzyme-gelling protein preparation in particulate form prepared by the process of claim 1.

23. A water-insoluble enzyme-gelling protein preparation in particulate form of claim 22 wherein the gelling protein is gelatin.

24. A water-insoluble enzyme-gelling protein preparation in particulate form of claim 22 wherein the gelling protein is egg white.

25. A water-insoluble enzyme-gelling protein preparation in particulate form of claim 22 wherein the bi- or polyfunctional protein reagent is glutaric dialdehyde.

26. A water-insoluble enzyme-gelling protein preparation in particulate form of claim 22 containing an insoluble filler.

27. A water-insoluble enzyme-gelling protein preparation in particulate form according to claim 26 wherein the filler is selected from the group consisting of finely divided silicates, silicon oxide, Dicalite and diatomaceous earth.

28. A water-insoluble enzyme-gelling protein preparation in particulate form of claim 22 wherein the enzyme is selected from the group consisting of an insoluble enzyme, or a complex of the enzyme with a hydrated metal oxide.

29. A method for the inversion of saccharose which comprises using as the enzyme a composition produced by the method of claim 1 wherein the enzyme is invertase.

30. A method for the hydrolysis of starch and dextrin which comprises using as the enzyme a composition produced by the method of claim 1 wherein the enzyme is amyloglucosidase.

References Cited

UNITED STATES PATENTS

| | | | |
|---|---|---|---|
| 3,639,558 | 2/1972 | Csizmas et al. | 195—68 |
| 3,705,084 | 12/1972 | Reynolds | 195—63 |
| 3,672,955 | 6/1972 | Stanley | 195—68 |
| 3,730,841 | 5/1973 | Forgione et al. | 195—63 |

DAVID M. NAFF, Primary Examiner

U.S. Cl. X.R.

195—63, 68, DIG. 11